United States Patent [19]

Briffod

[11] Patent Number: 4,547,646
[45] Date of Patent: Oct. 15, 1985

[54] METHOD AND APPARATUS FOR CUTTING OFF A PORTION OF A WORKPIECE BY ELECTRICAL DISCHARGE MACHINING, AND FOR SUPPORTING THE PORTION CUT OFF FROM THE WORKPIECE

[75] Inventor: Jean-Paul Briffod, Lucinges, France

[73] Assignee: Ateliers des Charmilles, S.A., Geneva, Switzerland

[21] Appl. No.: 477,087

[22] Filed: Mar. 21, 1983

[30] Foreign Application Priority Data

Apr. 8, 1982 [CH] Switzerland ............... 2189/82

[51] Int. Cl.⁴ .................. B23P 1/08; B23Q 3/08; B26D 7/02
[52] U.S. Cl. ................... 219/69 W; 83/167; 83/651.1; 204/206; 204/297 R; 219/69 M; 269/32; 269/152
[58] Field of Search ......... 219/69 W, 69 M, 69 E, 219/68, 69 R; 204/129, 46, 297 R, 297 W, 206; 51/217 R; 269/32, 152; 83/167, 171, 375, 651.1

[56] References Cited

U.S. PATENT DOCUMENTS

| | | | |
|---|---|---|---|
| 1,822,501 | 9/1931 | Onsrud | 269/32 |
| 2,816,586 | 12/1957 | Koberle | 269/152 |
| 3,495,258 | 2/1970 | Kholodnov et al. | 219/69 W |
| 3,731,044 | 5/1973 | Ullmann et al. | 219/69 W |
| 4,233,486 | 11/1980 | Inoue | 219/69 W |
| 4,484,052 | 11/1984 | Inoue | 219/69 W |
| 4,486,642 | 12/1984 | Inoue | 219/69 W |

FOREIGN PATENT DOCUMENTS 146409 2/1981 German Democratic Rep. ... 219/69 W
56-149119A 9/1982 Japan .................. 219/69 W

OTHER PUBLICATIONS

"Traveling Wire EDM", Presented at SME Tool Conference and Exposition, Nov. 1979, by Husman.

Primary Examiner—Roy N. Envall, Jr.
Assistant Examiner—Geoffrey S. Evans
Attorney, Agent, or Firm—Hauke & Patalidis

[57] ABSTRACT

A support mechanism for a workpiece cut off by electrical discharges in a travelling wire EDM apparatus. The workpiece is supported between support members provided with clamps. One support member is controllably pivotable around a horizontal axis, while the second support member is displaceable vertically and horizontally along crossed axes. In addition, the second support member may be rotated around a vertical axis. Through appropriate sequential operation of the clamps and relative displacement of the support members, the areas of the workpiece clamped by the clamps may be changed at will, and the cuttings from the workpiece may be supported by one of the clamp members to prevent the fall of the cuttings at the end of a cutting operation.

7 Claims, 4 Drawing Figures

METHOD AND APPARATUS FOR CUTTING OFF A PORTION OF A WORKPIECE BY ELECTRICAL DISCHARGE MACHINING, AND FOR SUPPORTING THE PORTION CUT OFF FROM THE WORKPIECE

BACKGROUND OF THE INVENTION

The present invention relates to electrical discharge machining (EDM) in general and more particularly to a method and apparatus for cutting a workpiece in a travelling wire EDM apparatus.

Internal stresses appearing in an electrically conductive workpiece in the process of being cut in a travelling wire EDM apparatus by means of an electrode wire is a common occurrence. The workpiece is severed in two portions which remain interconnected by a solid bridge of uncut metal. At the end of the cut, the bridge of uncut metal becomes progressively thinner, and internal stresses appear in the workpiece due to the pull exerted by the almost cut-off portion of the workpiece through the bridge of material.

Those internal stresses cause a deformation of the workpiece which is the cause of some machining errors. In addition, some specific precautionary measures must be taken to prevent the fall of the cut-out portion when the bridge of material is electrically eroded in its entirety Complete automation of the cutting operation is, under those conditions, very difficult to achieve.

Several solutions have been proposed in the past to prevent the fall of the cut-off portion of the workpiece, for example by providing a support plate sliding under the workpiece, or a pivoting support arm under the workpiece displaced by the same mechanism as the mechanism displacing the wire support and guide members, or yet by means of wedges placed in the cut or cleft.

All those solutions are complex and they require the intervention of the machine operator In addition they are not suitable to a completely automatic cutting operation.

SUMMARY OF THE INVENTION

The present invention has for principal object to eliminate the inconveniences of the prior art, as indicated hereinabove, such as to permit to effectuate an entirely automatic cutting operation in the course of which the workpiece is subjected to no internal stress. As a result, three dimensional cuts are, for the first time, achieved with high precision, and the cuttings can be disposed of without any intervention from the machine operator The invention accomplishes its objects by means of a method and apparatus permitting to accomplish a first machining step, to release a portion of the workpiece from one of its support members while maintaining the workpiece attached to another support member, to displace the released support member relative to the other support member such as to engage another portion of the workpiece with the released support member, to hold such other portion of the workpiece, which may include the portion being cut-off from the workpiece, with that support member, and to subsequently effectuate another step of the machining operation.

The present invention will be best understood by those skilled in the art when the following description of some of the best modes contemplated for practicing the invention is read in conjunction with the accompanying drawing, illustrating in a schematic manner examples of structure for practicing the method of the invention and diverse steps of the method according to the invention.

DETAILED DESCRIPTION OF THE PREFERRED EMBODIMENTS

Figure 1:
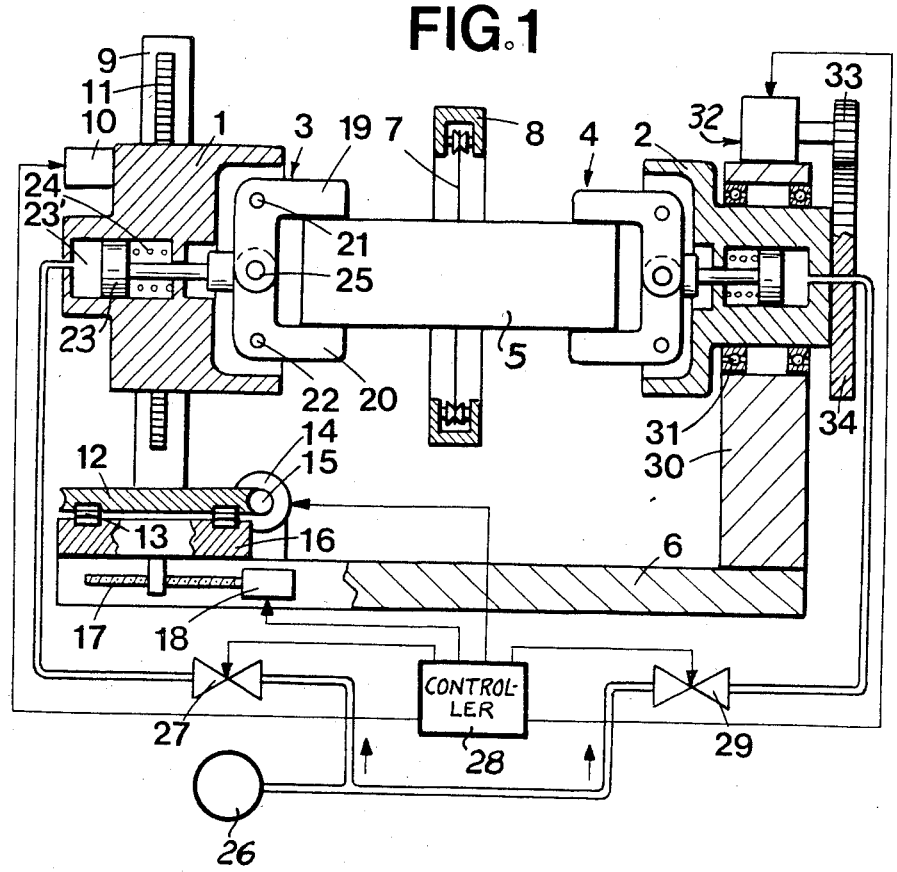
FIG. 1 is a sectional view through a portion of a travelling wire EDM apparatus.

With reference to FIG. 1, a travelling wire EDM apparatus, according to the present invention, has a pair of support members 1 and 2 each provided with a clamp, 3 and 4 respectively, for supporting a workpiece 5. The support members 1 and 2 are mounted on a bed portion 6 of the machine frame. A cut is effected on the workpiece 5 by applying consecutive electrical discharges across the workpiece 5 and an electrode tool taking the form of a metallic wire 7. The wire 7 is supported by a generally C-shaped support member 8 which is movable relative to the workpiece 5.

The means for feeding the electrode wire 7 longitudinally, for displacing the wire support member 8 relative to the workpiece 5 and the means for providing and controlling the machining current are not shown in the drawing, as such means are well known to those skilled in the art of electrical discharge machining, EDM.

The support member 1 is slidably mounted on a column 9 and is displaceable vertically, as shown in the drawing, by an electric servo motor 10 mounted on the support member 1 and having a geared output, not shown, co-operating with a rack 11 mounted on the column 9. The column 9 is in turn mounted on a circular plate 12 rotatable around a vertical axis relative to a slide 16, appropriate bearings 13 being disposed between the circular plate 12 and the slide 16. Rotation of the circular plate 12 is effected by an electric servo motor 14 driving a worm gear 15 meshing with teeth provided on the periphery of the circular plate 12. The slide 16 is supported by the frame bed 6 and is linearly slidable relative to the bed 6 by means of a leadscrew 17 driven by an electric servo motor 18.

The clamp 3 comprises a pair of jaws 19 and 20, pivotable about pivot pins 21 and 22 relative to the support member 1. Pivoting of the clamp jaws 19 and 20 is controlled by a hydraulic piston 23 reciprocable in a hydraulic cylinder 23' against the action of a return spring 24 The force exerted by the return spring 24 upon the piston 23 is applied upon a link 25 between the jaws 19 and 20 in a direction that causes an edge of the workpiece 5 to be clamped between the jaws 19 and 20. Opening of the clamp 3 is controlled by admitting fluid under pressure into the cylinder 23' from a pressurized fluid tank 26 through an electrically operated valve 27. The valve 27 is operated, according to a predetermined program, from an electronic controller 28.

The clamp 4 is structurally and functionally identical to the clamp 3. The operation of the clamp 4 is effected in the same manner as that of the clamp 3 by an electrically controlled valve 29. The support member 2 of the clamp 4 is rotatable around a horizontal axis within a block 30 fixedly supported by the bed 6. The clamp support member 2 is rotatably supported by the block 30 through a bearing 31, and is driven in rotation by an electric motor 32 whose output shaft is provided with a pinion 33 meshing with the teeth of a toothed wheel 34 affixed to the support member 2.

It is therefore readily apparent that the workpiece 5 can be marginally held by either one or the other of the clamps 3 and 4, or simultaneously by both clamps 3 and 4. The displacement mechanism of the support members 1 and 2 enables the workpiece 5 to be oriented in any desired position.

Figure 2:
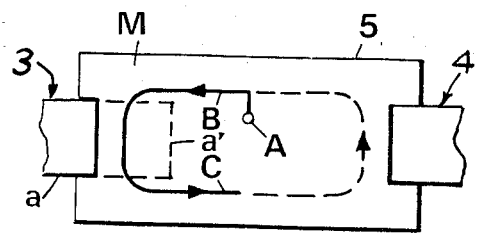
FIGS. 2 and 3 schematically illustrate two conditions of machining.

FIG. 2 schematically illustrates a machining operation effected on the internal surface of the workpiece 5, for example to form a die M. Prior to beginning the first cutting step, the workpiece 5 is marginally held at each end by the clamps 3 and 4, and a cut is effected by the electrode wire 7 in the workpiece along the path ABC shown at FIG. 2 in full line, starting at a pre-drilled hole A. Prior to continuing the cut along the path CB, shown in dashed line, the clamp 3 is open and is displaced from the position shown in full line at a to the position shown in dashed line at a', as a result of moving the slide 16, FIG. 1, by way of the servo motor 18 under the control of the controller 28, such as to be clamped in overlap also over the portion of the workpiece 5 which has already been partially severed from the remaining of the workpiece. The cut is continued along the path CB, and the cut-out portion of the workpiece 5 is held by the clamp 3. After the cut has been completed, the clamp 4 is released from the workpiece 5, and the workpiece now held by the clamp 3, including the cut-out portion now completely severed from the workpiece but still held by the overlapping portion of the jaws of the clamp 3, is evacuated through the motion of the support member 1, FIG. 1, of the clamp 3.

Figure 3:
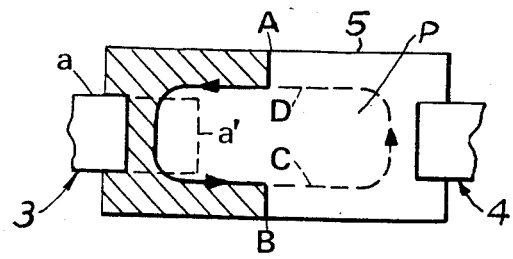

FIG. 3 illustrates schematically a cutting operation effected on a workpiece 5 for obtaining a part such as the punch P. The cut is effected in part transversely along the path AB shown in full line. Prior to the end of the cut, the clamp 3 is opened and is displaced from the position a to the position a'. In the position a', the clamp 3 is holding simultaneously an edge ortion of the workpiece 5 and the partially severed cutting or cut-off portion, shown with cross-hatch. The cut is finished to the end of the path AB, and continued along the path CD shown in dashed line, both the punch P and the cutting shown in cross-hatch being held by the clamp 3 until the end of the cutting operation.

As an alternative, a first cut could be effected along the path AB, with the clamp 3 in the position a, the cutting shown in cross-hatch evacuated by the clamp 3, and subsequently the clamp 3 brought into the position a' such as to hold and support the punch P until the end of the cut-out operation.

Figure 4:
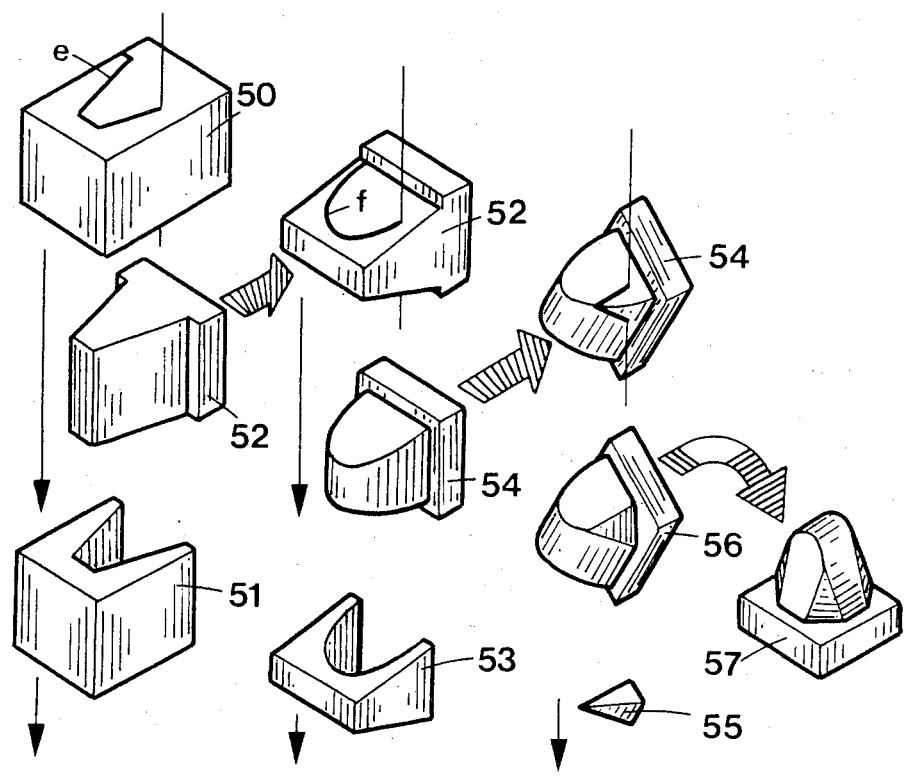
FIG. 4 is a schematic diagram illustrating progressive steps in a three-dimensional machining of a workpiece.

FIG. 4 is a flow diagram schematically illustrating consecutive steps for effecting a three-dimensional cut on a workpiece 50 by means of the apparatus of FIG. 1.

The first cut is effected along the trajectory e, in the same manner as the first step, cut AB, of the cut schematically illustrated at FIG. 3, such as to sever the workpiece into sections, one of the sections 51, being supported by one of the clamps, such as clamp 3 for example and the other section, section 52, being supported by the clamp 4. The workpiece section 51 is evacuated as a result of a motion of the slide 16 toward the left, FIG. 1, followed by rotation of the circular plate 12, and opening of the clamp 3. The workpiece portion 52, held by the clamp 4 is rotated by 90°, by rotating the clamp support member 2 by way of the motor 32. The opposite end of the workpiece portion 52 is subsequently grabbed by the clamp 3, and an additional cut is effected along the trajectory or path f, such that the workpiece is severed in two portions, the portion 53 representing a cutting which is evacuated by the clamp 3 as a result of displacement of the support member 1, the workpiece portion 54 remaining clamped in the clamp 4.

An additional machining step may be accomplished as, for example, for removing portions 55 from the workpiece 54, after rotating the workpiece 54 held by the clamp 4, 45° from its original position, and subsequently effecting three additional cuts, further rotating the workpiece 54 90° between cuts such as to obtain the final shape represented at 57 through the intermediary shape shown at 56 by removing at each cutting operation a corner piece as shown at 55.

All the consecutive cutting operations hereinbefore described can be achieved entirely automatically without any intervention on the part of a machine operator. It will be readily apparent to those skilled in the art that a wide variety of shapes can be machined by way of the apparatus and method of the invention, and that machining can be obtained with a very high precision in view of the possibility of supporting the cuttings, or portions removed from the workpiece in the course of a machining operation. In addition, by way of the method of the invention molding and drawing dies with cavities may be achieved by cutting off sections from a workpiece, recovering the sections, and subsequently assembling the sections together in order to form the molding or drawing die.

It will be further appreciated that the structure of FIG. 1 can be modified as far as the arrangexent of elements is concerned for displacing and/or rotating the workpiece support member, for clamping and unclamping the workpiece, and that electromagnetic holders may be used instead of clamps, or pincers such as are currently used in industrial robots.

Having thus described the present invention by way of a structural arrangement of elements well designed for practicing the method of the invention, what is claimed as new is as follows:

1. A method for cutting off a portion from a conductive workpiece by means of an electrode wire EDM apparatus, said workpiece being held by a pair of workpiece support members mounted on a bed, said bed being movable relative to an electrode wire for effecting on said workpiece a cut of predetermined path, said method comprising supporting said workpiece by both said support members, effecting a partial cutting operation by electrical discharges through said workpiece for partially cutting off a portion from said workpiece, disengaging one of said support members from said workpiece, displacing said disengaged support member relative to the other support member to a position permitting to re-engage said support member with at least the portion of the workpiece being partially cut-off from the workpiece for supporting said partially cut-off portion, and severing said portion from said workpiece by completing said cut-off operation.

2. The method of claim 1 further comprising further displacing one of said support members to a predetermined position for removal of said workpiece cut-off portion and disposal of said cut-off portion.

3. The method of claim 1 further comprising rotating said workpiece by the other of said support members about an axis at right angle to the direction of travel of said electrode wire, and effecting a subsequent cut in said workpiece by means of said electrode wire.

4. In an apparatus for cutting off by electrical discharges a portion of a conductive workpiece by means of a travelling wire electrode, the improvement comprising a pair of clamp members supporting said workpiece, a pair of support members each supporting one of said clamp members, said support members being mounted on a bed displaceable relative to said electrode wire for cutting off a portion thereof, linear slide means disposed between one of said support members and said bed, means for linearly displacing said one of said support members relative to the other along a predetermined axis of displacement, means co-operating with at least one of said clamp members for clamping and unclamping a portion of said workpiece, means for controlling the relative displacement of said support members, means for controlling the clamping and unclamping of said workpiece by said clamp members according to a predetermined sequency, wherein one of said support members is rotatably supported from said bed and further comprising means controllably rotating said one of said support members around an axis perpendicular to the direction of relative displacement of said electrode wire into said workpiece.

5. The improvement of claim 4 wherein one of said clamp members is rotatably supported by its support member about an axis parallel to the direction of relative displacement of said electrode wire and further comprising means for controllably rotating said clamp member around said axis parallel to the direction of relative displacement of said electrode wire into said workpiece.

6. The improvement of claim 4 wherein one of said clamp members is linearly displaceable relative to its support member along an axis substantially perpendicular to said predetermined axis of displacement and further comprising means for linearly displacing said clamp member relative to its support member along said axis substantially perpendicular to said predetermined axis.

7. The improvement of claim 5 wherein one of said clamp members is linearly displaceable relative to its support member along an axis substantially perpendicular to said predetermined axis of displacement and further comprising means for linearly displacing said clamp member relative to its support member along said axis substantially perpendicular to said predetermined axis.

* * * * *

UNITED STATES PATENT AND TRADEMARK OFFICE
CERTIFICATE OF CORRECTION

PATENT NO. : 4,547,646

DATED : October 15, 1985

INVENTOR(S) : Jean-Paul Briffod

It is certified that error appears in the above-identified patent and that said Letters Patent is hereby corrected as shown below:

```
Column 1, lines 27-28, after "entirely" insert a period --.--
Column 1, line  52, after "operator" insert a period --. --
Column 2, line 54, after "24" insert a period --. --
Column 3, line 42, "ortion" should read -- portion --
Column 4, line 35, "arrangexent" should read -- arrangement --
Column 4, line 53, correct the spelling of "discharges"
Column 5, line 24, "sequency" should read -- sequence --
```

Signed and Sealed this

Eighth Day of July 1986

[SEAL]

Attest:

DONALD J. QUIGG

Attesting Officer

Commissioner of Patents and Trademarks